July 31, 1934.  O. L. LEWIS  1,968,408
LAWN MOWER
Original Filed March 28, 1929
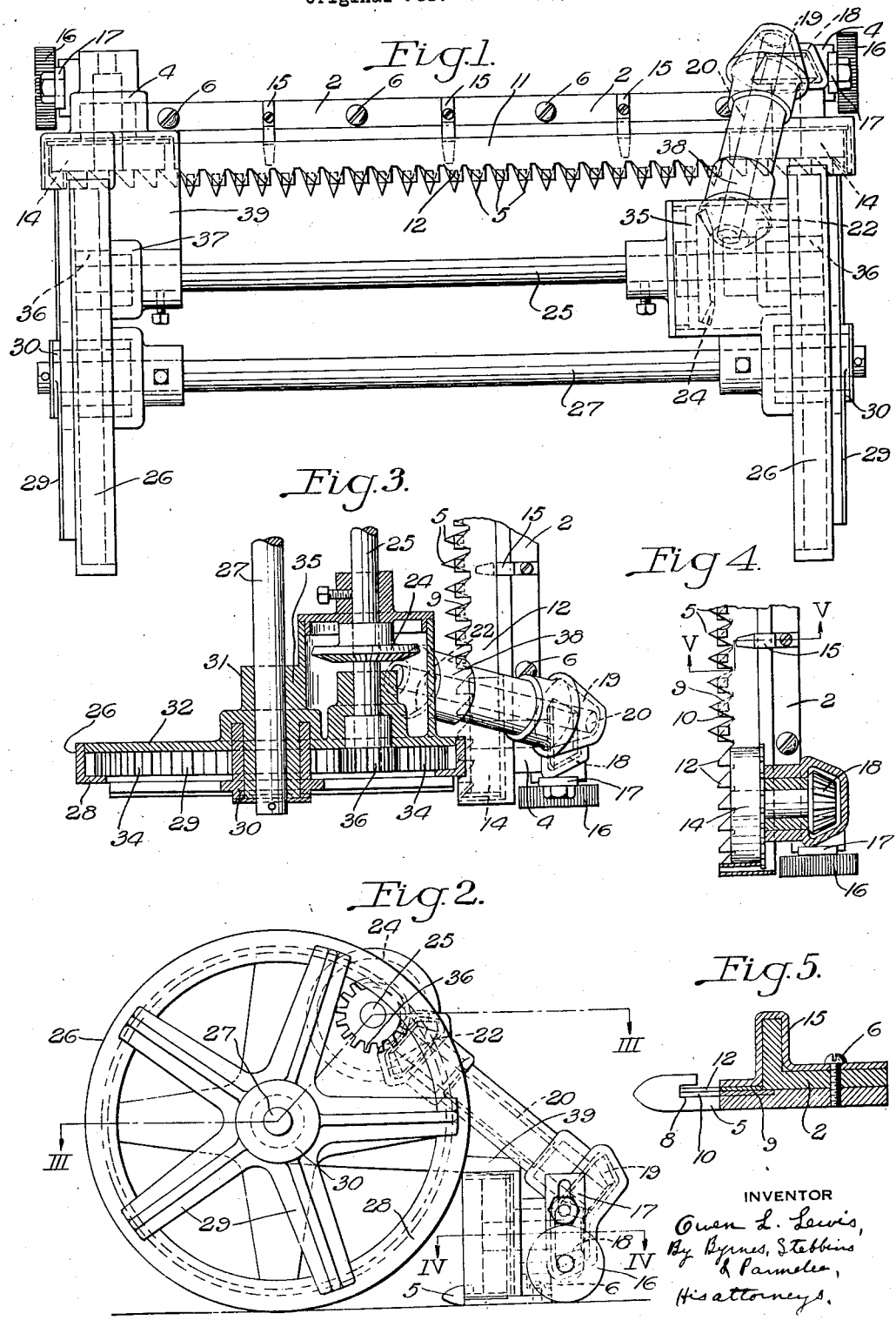
INVENTOR
Owen L. Lewis,
By Byrnes, Stebbins
& Parmelee,
His attorneys.

Patented July 31, 1934

1,968,408

UNITED STATES PATENT OFFICE 1,968,408

LAWN MOWER

Owen L. Lewis, Alliance, Ohio, assignor to The Alliance Manufacturing Company, Alliance, Ohio, a corporation of Ohio Application March 28, 1929, Serial No. 350,557
Renewed May 26, 1934

1 Claim. (Cl. 56—244)

My invention relates to lawn mowers and more particularly to lawn mowers utilizing an endless cutting band.

Lawn mowers in general use comprise a rotating cylinder of curved knives which overhang a cutting blade along which the curved portions of the rotating knives progress. Such lawn mowers are relatively heavy and require considerable effort to overcome the inertia of the machine when at rest. Due to the large tractive effort required to propel such a lawn mower, it is difficult to operate it on sloping surfaces such as terraces. The position of the rotating blades in advance of the relatively stationary cutting blade, makes it impossible to trim grass near trees, shrubbery and other objects.

Difficulty is also had with such a lawn mower when the grass being cut is too tall. Under such conditions, the rotating blades tend to double the grass over the relatively stationary cutting blade, thereby increasing the cutting effort required for the lawn mower and producing a ragged cut. In some instances, such a lawn mower will not seize grass but will roll over it instead of cutting it. Such lawn mowers are noisy.

Efforts have heretofore been made to utilize lawn mowers having a relatively stationary cutting blade cooperating with cutting means mounted on links and belts. In such constructions, however, the links and belts become loosened during wear with the result that they become noisy and are kept on their driving pulleys with difficulty. In such structures the mass of material constituting the belt is considerable and offers considerable inertia to the propelling of the lawn mower.

I provide an easily driven lawn mower in which an endless band of flexible material passes around spaced pulleys. Cutting means carried by the band cooperate with cutting means provided on a relatively stationary blade. By reason of the light weight of the machine and the small tractive effort required to move it, it can be used in many places where lawn mowers of the rotary blade type are not usable, such as on terraces and on uneven ground.

By reason of the relatively few parts and their simple character, an unskilled operator can readily replace the cutting blade and cutting band. The cutting surfaces of the machine can be brought much closer to an obstruction, such as a tree or bush, than can a lawn mower having overhanging rotating blades. The lawn mower can be made considerably wider than other types of lawn mowers requiring the same tractive effort.

The lawn mower can be used in tall grass since the cooperating cutting means directly engage the stems of the grass and other vegetation being severed.

I also provide a certain novel construction, the details of which are hereinafter more fully described.

The accompanying drawing illustrates the present preferred embodiment of the invention, in which Figure 1 is a plan view of a lawn mower embodying my invention, Figure 2 is an end view thereof, Figure 3 is a partial sectional view of the lawn mower taken along the section line III—III of Figure 2, Figure 4 is a sectional view of a part of the actuating mechanism for the lawn mower taken along the section line IV—IV of Figure 2, and Figure 5 is a sectional view through the cutting blades taken along the section line V—V of Figure 4.

Referring to the drawing, a lawn mower comprises a support 2 in the form of a plate 2 extending between end frames 4 and supporting a plurality of tapered blade guards 5 projecting forwardly therefrom. The blade guards 5 are secured by screws 6 to the plate 2. The guards 5 are provided with overhung recesses 8 in which a toothed blade 9 is disposed. The rear edges of the blades 9 underlie the forward edge of the support 2. The blade 9 is inserted longitudinally of the alined recesses in the guards 5 from either end of the machine. The blade 9 is provided with a plurality of outwardly tapering teeth 10.

A continuous band 11 of flexible material and provided with teeth 12 is carried by pulleys 14 mounted in each of the end frames 4. The lower run of the band 11 lies within the recesses in the several guards 5 and underlies clamps 15 carried by the support 2. The clamps 15 firmly hold the lower run of the band 11 against the forward edge of the support 2 and in cutting engagement with the teeth 10.

As the band 11 is constituted by a thin metal strip, it is light and flexible. Since the band is continuous there are no joints to become loosened with a resultant decrease in operating efficiency and an increase in noise produced. The light structure of the machine and the relatively small tractive effort required to move it permit of its use in places where other types of lawn mowers are useless, such as on steep terraces. The band 11 is easily replaced by an inexperienced operator as are the blades 9.

The end frames 4 are secured to wheels 16 by adjustable brackets 17 so that the elevation of the support 2 may be varied with a resulting change in the elevation of the cutting edges of the lawn mower. For actuating the band 11, the shaft for supporting one of the pulleys 14 is provided with a bevel gear 18 meshing with a bevel gear 19 carried by a shaft 20. The other end of the shaft 20 is provided with a bevel gear 22 meshing with a gear 24 mounted on a shaft 25. The other pulley 14 is rotated by the tension in the band 11. The bearings for either or both of the pulleys 14 may be made adjustable for controlling the tension on the band 11.

For imparting turning movement to the shaft 25, a pair of driving wheels 26 are mounted on a stationary shaft 27. Each of the wheels 26 comprises an outer rim 28 connected by spokes 29 to a hub 30. Each hub 30 encloses a hub 31 carried by an inner web 32. The peripheral surfaces of each web 32 remain substantially stationary during the rotation of the cooperating rims 26. The inner surface of each rim 26 is provided with gear teeth 34. Portions of the wheels 26 and web 32 are cut away to reduce the weight of the machine and the amount of material required.

The gear 24 on the shaft 25 is enclosed in a housing 35 carried by the web 32. A pinion 36, mounted at the end of the shaft 25, meshes with the teeth 34. At the other end of the shaft a similar pinion 36 meshes with gear teeth on the other wheel 26. A housing 37 of smaller size than the housing 35 is carried by the other web 32 for supporting the second end of the shaft 25. During rotation of the driving wheels 26 the pinions 36 mesh with the gear teeth 34 for rotating the shaft 25. Motion of the shaft 25 is transmitted to the gear 18 through the gears 24, 22, the shaft 20 and the gear 19.

A housing 38 connects the housing 35 with the adjacent end frame 4 on the support 2 for constituting a tractive connection between the frame 35 and the end frame 4. The other end frame 4 is connected to the web 32 at the opposite end of the machine by a frame 39, so that the forward movement of the driving wheels 26 is conveyed to the support 2. The driving wheels 26 are moved by a suitable handle, not shown, attached to the webs 32, in a manner well understood in the art.

While I have illustrated and described the present preferred form of my invention, it is to be understood that it may be otherwise embodied within the scope of the following claim.

I claim:

A mower comprising a support, a plurality of recessed guards carried by said support, a cutting blade common to a plurality of said guards seated in the recesses in said guards, a cutting band movable in the recesses in said guards for cooperating with said blade, and means for holding the band and blade in said guards.

OWEN L. LEWIS.